United States Patent
Chen et al.

(10) Patent No.: US 8,151,581 B2
(45) Date of Patent: Apr. 10, 2012

(54) SYSTEM AND METHOD FOR CONTROLLING A VEHICLE ENGINE

(75) Inventors: Elaine Y. Chen, Dearborn, MI (US); William Treharne, Ypsilanti Township, MI (US); Wayne Buescher, Canton, MI (US); Thomas Fox, Livonia, MI (US); Shailesh Kozarekar, Novi, MI (US)

(73) Assignee: Ford Global Technologies, LLC, Deaborn, MI (US)

( * ) Notice: Subject to any disclaimer, the term of this patent is extended or adjusted under 35 U.S.C. 154(b) by 1258 days.

(21) Appl. No.: 11/564,488

(22) Filed: Nov. 29, 2006

(65) Prior Publication Data

US 2008/0125935 A1    May 29, 2008

(51) Int. Cl.
G05D 23/32    (2006.01)
F25B 1/00    (2006.01)
B60H 1/32    (2006.01)

(52) U.S. Cl. .............................. 62/157; 62/244; 62/228.1

(58) Field of Classification Search ................... 62/157, 62/244, 236, 230, 228.5, 228.1, 239; 701/36
See application file for complete search history.

(56) References Cited

U.S. PATENT DOCUMENTS

| | | | |
|---|---|---|---|
| 2,477,377 A | 11/1943 | Jones | |
| 4,667,480 A | 5/1987 | Bessler | |
| 4,918,937 A | 4/1990 | Fineblum | |
| 5,018,362 A | 5/1991 | Nagase et al. | |
| 5,117,643 A | 6/1992 | Sakurai et al. | |
| 5,275,011 A | 1/1994 | Hanson et al. | |
| 5,317,998 A | 6/1994 | Hanson et al. | |
| 5,341,651 A | 8/1994 | Inoue | |
| 5,441,122 A | 8/1995 | Yoshida | |
| 5,497,941 A | 3/1996 | Numazawa et al. | |
| 5,867,996 A | 2/1999 | Takano et al. | |
| 5,934,089 A | 8/1999 | Nakagawa et al. | |
| 6,073,456 A * | 6/2000 | Kawai et al. ................... 62/133 |
| 6,330,909 B1 | 12/2001 | Takahashi et al. | |
| 6,515,448 B2 | 2/2003 | Iritani et al. | |
| 6,516,621 B2 | 2/2003 | Homan et al. | |
| 6,688,120 B2 | 2/2004 | Aoki et al. | |
| 6,782,704 B2 | 8/2004 | Kuroda et al. | |
| 6,807,470 B2 | 10/2004 | Hara | |
| 6,817,330 B1 | 11/2004 | Ogawa et al. | |
| 6,973,798 B2 | 12/2005 | Ikura et al. | |

(Continued)

FOREIGN PATENT DOCUMENTS

JP    4208624    7/1992

(Continued)

OTHER PUBLICATIONS

A. F. Burke, On-Off Engine Operation For Hybrid/Electric Vehicles, "The World's Knowledge" supplied by The British Library.

*Primary Examiner* — Chen Wen Jiang

(74) *Attorney, Agent, or Firm* — David B. Kelley; Brooks Kushman P.C.

(57) ABSTRACT

Systems and methods to control an engine configured to drive a compressor of a vehicle air conditioning system having a desired temperature are provided. A time until a threshold is reached is determined based on an environment condition and a vehicle interior condition. A request for the engine to run is removed if the time is greater than a minimum time.

14 Claims, 6 Drawing Sheets

U.S. PATENT DOCUMENTS

| | | |
|---|---|---|
| 6,981,544 B2 | 1/2006 | Iwanami et al. |
| 2003/0233835 A1 | 12/2003 | Tomita et al. |
| 2004/0144107 A1 | 7/2004 | Breton et al. |
| 2004/0149246 A1 | 8/2004 | Itoh et al. |
| 2004/0250560 A1 * | 12/2004 | Ikura et al. ............ 62/236 |
| 2005/0044873 A1 | 3/2005 | Tamai et al. |
| 2005/0268632 A1 | 12/2005 | Yonekura et al. |
| 2006/0225450 A1 | 10/2006 | Dage et al. |
| 2007/0049455 A1 | 3/2007 | Kuramochi |

FOREIGN PATENT DOCUMENTS

| | | |
|---|---|---|
| JP | 10258629 | 9/1998 |
| JP | 2001113940 | 4/2001 |
| JP | 2003285637 A * | 10/2003 |

* cited by examiner

| | Ambient Temp. | Ambient Humidity | Apparent Ambient Temp. | Sun Load | Time | Apparent Cabin Temp. Change | Rate of Apparent Cabin Temp. Change |
|---|---|---|---|---|---|---|---|
| 1 | 60 | 50 | 60 | 200 | 400 | 10 | 40 |
| 2 | 65 | 70 | 65 | 240 | 500 | 10 | 50 |
| 3 | 70 | 10 | 65 | 220 | 400 | 10 | 40 |
| 4 | 70 | 70 | 70 | 200 | 250 | 10 | 25 |
| 5 | 75 | 10 | 70 | 240 | 200 | 10 | 30 |
| 6 | 75 | 50 | 75 | 220 | 200 | 10 | 20 |
| 7 | 80 | 10 | 75 | 200 | 150 | 10 | 15 |
| 8 | 80 | 45 | 80 | 240 | 150 | 10 | 15 |
| 9 | 85 | 10 | 80 | 220 | 100 | 10 | 10 |
| 10 | 80 | 70 | 85 | 200 | 50 | 10 | 5 |
| 11 | 85 | 35 | 85 | 240 | 100 | 10 | 10 |
| 12 | 90 | 30 | 90 | 240 | 10 | 10 | 1 |

Fig. 3

| Sun Load/Apparent Ambient Temperature | <=60° F | 65° F | 70° F | 75° F | 80° F | 85° F | >=90° F |
|---|---|---|---|---|---|---|---|
| >=240 (dark) | 60 | 50 | 30 | 25 | 15 | 10 | 1 |
| 220 | 50 | 40 | 27 | 20 | 10 | 7 | 0 |
| <=200 (sunny) | 40 | 30 | 25 | 15 | 5 | 5 | 0 |

Fig. 4

| Number of Engine Stops | 1 | 2 | 3 | >=4 |
|---|---|---|---|---|
| Minimum Time | 45 | 60 | 60 | 60 |

SYSTEM AND METHOD FOR CONTROLLING A VEHICLE ENGINE

BACKGROUND OF THE INVENTION

1. Field of the Invention

The invention relates to systems and methods for controlling a vehicle engine.

2. Background Discussion

An engine of an alternatively powered vehicle, e.g., a hybrid electric vehicle, may drive a compressor of the vehicle's air conditioning system such that when the engine is off during an electric drive mode, the compressor is off. The compressor may be selectively operated by starting the engine such that an occupant-selected desired temperature is achieved.

If a vehicle is not moving, the vehicle's engine may be stopped. The engine may be stopped, for example, if a cabin temperature is less than a threshold temperature. Such a strategy may result in the frequent stopping and starting of the engine which may affect fuel economy, driveability, and noise, vibration, and harshness. For example, the cabin temperature may be 1 degree Fahrenheit (F.) below a threshold temperature, resulting in an engine stop. An ambient temperature may be such that within a short period of time, e.g., five seconds, the cabin temperature would be greater than the threshold temperature, resulting in an engine start.

A system and method are desired that would prevent the frequent stopping and starting of a vehicle's engine.

SUMMARY OF THE INVENTION

In at least one embodiment, the invention takes the form of a system and method for controlling an engine configured to drive a compressor of a vehicle air conditioning system having a desired temperature. The system includes a control system arrangement configured to receive a vehicle environment condition and a vehicle interior condition. The system determines a time until a threshold is reached based on the environment condition and the interior condition. The system also removes a request for the engine to run if the time is greater than a minimum time.

BRIEF DESCRIPTION OF THE DRAWINGS

FIG. 3 shows example data used in implementing embodiments of the invention.

FIG. 4 shows example data used in implementing embodiments of the invention.

DETAILED DESCRIPTION OF AN EMBODIMENT OF THE INVENTION

Figure 1:
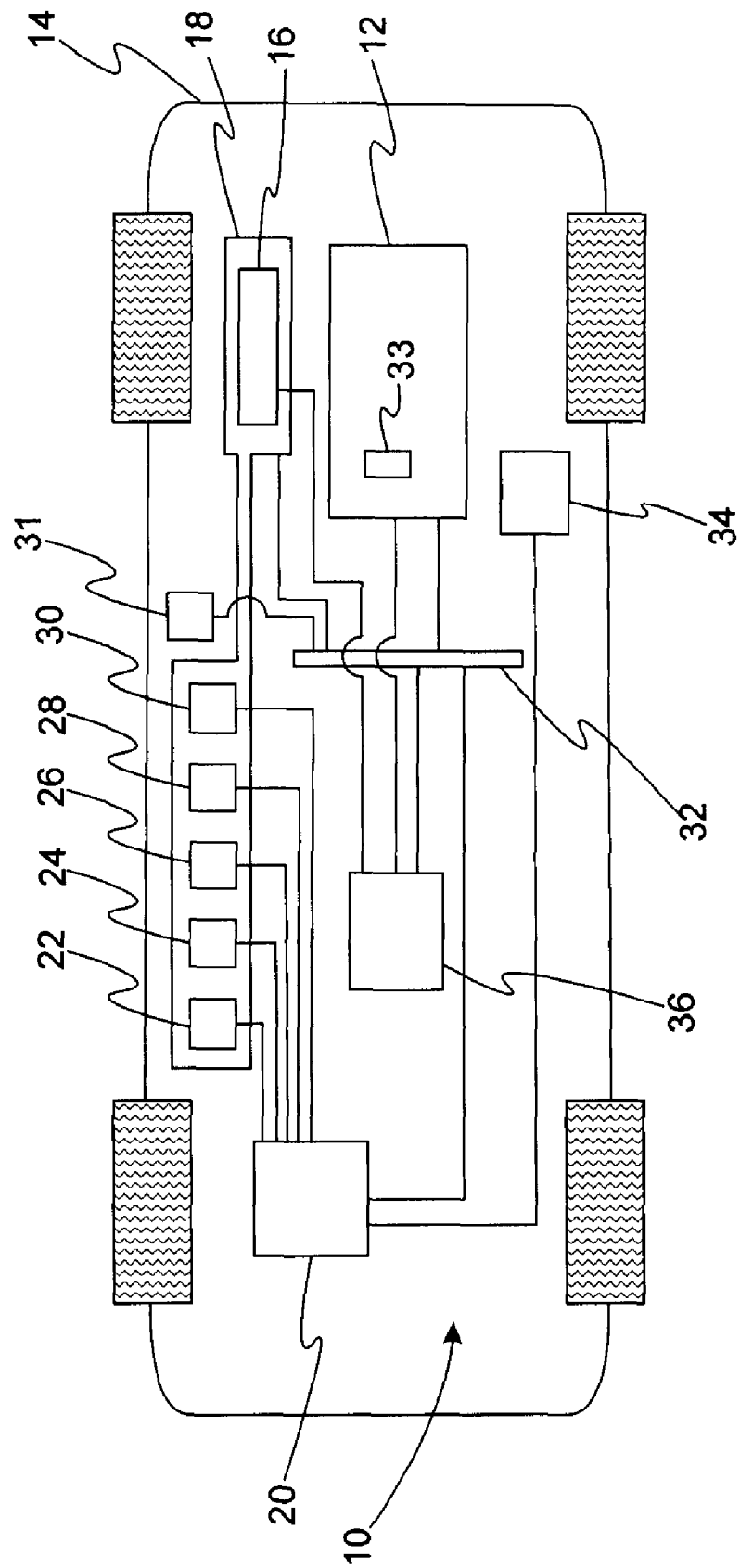
FIG. 1 shows a system for controlling a vehicle engine in accordance with an embodiment of the invention.

FIG. 1 shows system 10 for controlling engine 12 of vehicle 14. Engine 12 drives compressor 16 of air conditioning system 18 such that if engine 12 is off, compressor 16 is off.

Vehicle 14 includes climate control module 20, ambient temperature sensor 22, ambient humidity sensor 24, sun load sensor 26, cabin temperature sensor 28, cabin humidity sensor 30, and vehicle speed sensor 31. Fewer or other sensors may be used, e.g., ambient humidity sensor 24 may be omitted.

In the embodiment of FIG. 1, sensors 22, 24, 26, 28, and 30 are part of air conditioning system 18.

Sensors 22, 24, 26, 28, and 30 communicate directly with climate control module 20. One or more of these sensors may, alternatively, communicate their respective readings to climate control module 20, or any other module or system, via data bus 32 using a Controller Area Network (CAN) protocol or via any other suitable means, e.g., hardwire or wireless.

Vehicle 14 includes manual input 34, e.g., buttons on a climate control head. Manual input 34 permits an occupant of vehicle 12 to manually input a comfort level selection, e.g., economy mode or non-economy mode, as will be explained in detail below. Manual input 34 also permits an occupant to select a desired temperature for the vehicle's cabin. Manual input 34 communicates directly with climate control module 20.

System 10 includes control system arrangement 36, e.g., powertrain control module and vehicle system controller. Control system arrangement 36 may comprise one or more control modules in various locations of vehicle 14.

Control system arrangement 36 controls engine 12, determines whether vehicle 14 is moving based on a vehicle speed broadcast via data bus 32 from speed sensor 31, and determines an on/off state of engine 12 based on engine speed broadcast via data bus 32 from engine speed sensor 33. Control system arrangement 36, however, may determine whether vehicle 14 is moving and the on/off state of engine 12 in any suitable fashion.

Control system arrangement 36, air conditioning system 18, and climate control module 20 communicate via data bus 32 using CAN. Climate control module 20 may broadcast data from sensors 22, 24, 26, 28, and 30 over data bus 32. Control system arrangement 36 may, alternatively, request data regarding sensors 22, 24, 26, 28, and 30 from climate control module 20.

Control system arrangement 36, engine 12, and compressor 16 communicate directly via hardwire. Control system arrangement 36, engine 12, air conditioning system 18, climate control module 28, and manual input 34 may communicate, alternatively, in any suitable fashion, e.g., hardwire or wireless.

Figure 2A:
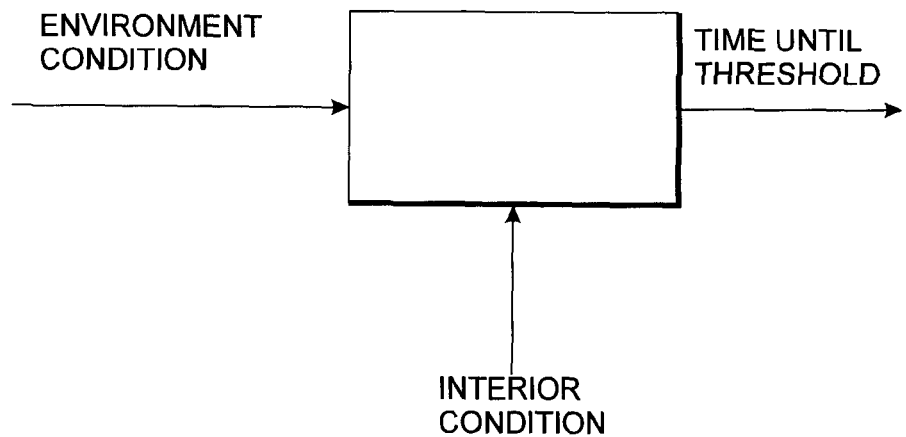
FIGS. 2a-2b show inputs and outputs of a control system arrangement in accordance with an embodiment of the invention.

FIG. 2a shows the inputs, e.g., the environment condition and the interior condition, used by control system arrangement 36 to determine the time until a threshold is reached.

The threshold may be a predetermined apparent cabin temperature beyond which an occupant may experience discomfort due to a change in temperature. For example, if an occupant sets the desired temperature to 72 degrees Fahrenheit (F.), the threshold apparent cabin temperature may be 77 degrees F. Above 77 degrees F., the occupant may experience discomfort.

The threshold temperature may be set at a fixed amount, e.g., 5 degrees F., above the desired temperature. For example, if the desired temperature is 70 degrees F., the threshold temperature will be 75 degrees F. The fixed amount may be determined in any suitable fashion including via in-car testing or computer modeling.

The threshold temperature may be a function of the desired temperature. For example, as the desired temperature decreases the difference between the threshold temperature and the desired temperature may increase. If the desired temperature is 65 degrees F., the threshold temperature may by 72 degrees F. If the desired temperature is 70 degrees F., the threshold temperature may be 75 degrees F.

The threshold temperature may be determined for each possible desired temperature. For example, testing may reveal that the threshold temperature is 76 degrees F. for a desired temperature of 70 degrees F. and that the threshold temperature is 75 degrees F. for a desired temperature of 71 degrees F. Threshold temperatures, alternatively, may be determined in any suitable fashion.

The threshold temperature may depend on the comfort-level selection of an occupant. For example, if an occupant selects an economy mode, the temperature threshold is greater than when the occupant selects the non-economy mode. If the threshold temperature is 80 degrees F. in the non-economy mode, relative to a 75 degree F desired temperature, the threshold temperature is 83 degrees F. in the economy mode. An occupant may be selectively willing to experience a greater temperature change relative to their desired temperature thereby reducing engine on time in an effort to improve fuel economy.

Figure 2B:
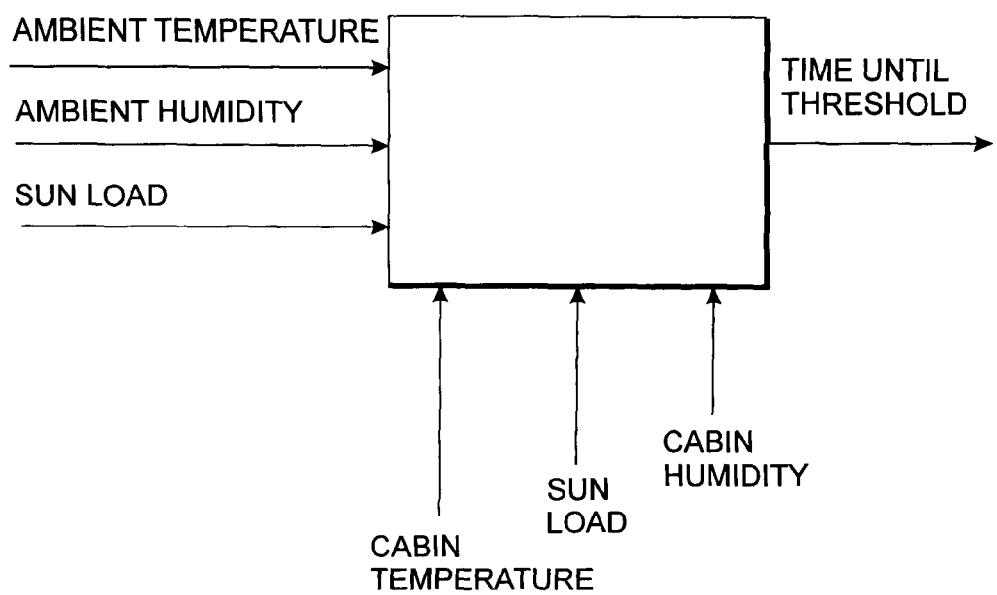

FIG. 2b shows an example set of inputs. Ambient temperature, ambient humidity, and sun load comprise the environment condition. Cabin temperature, cabin humidity, and sun load comprise the interior condition. Fewer or other inputs may also used.

Control system arrangement 36 may determine a time until the threshold is reached in any number of ways. For example, the time it takes for apparent cabin temperature, e.g., cabin temperature and cabin humidity, to increase by a fixed amount, e.g., 10 degrees F., may be measured for various levels of ambient temperature, ambient humidity, and sun load. A vehicle may be put into an environment at 80 degrees F. ambient temperature, 45% ambient humidity, and 200 count sun load. The cabin may be cooled to an apparent temperature of 70 degrees F., the engine turned off, and the time measured for the apparent cabin temperature to increase from 70 degrees F. to 80 degrees F. If such a time is 150 seconds, the rate of apparent temperature change, in seconds per degree F., would be 15. This procedure could be repeated for other environment conditions.

FIG. 3 shows an example set of data resulting from the above procedure. In this example, apparent ambient temperature is a measure of ambient temperature and ambient humidity.

FIG. 4 shows an example look-up table that lists the rate of apparent cabin temperature change for various levels of sun load and apparent ambient temperature. Any suitable algorithm, e.g., a regressive algorithm, may be used to calculate the rate of apparent temperature change for values of sun load and apparent ambient temperature between those listed.

Figures 5, 7:
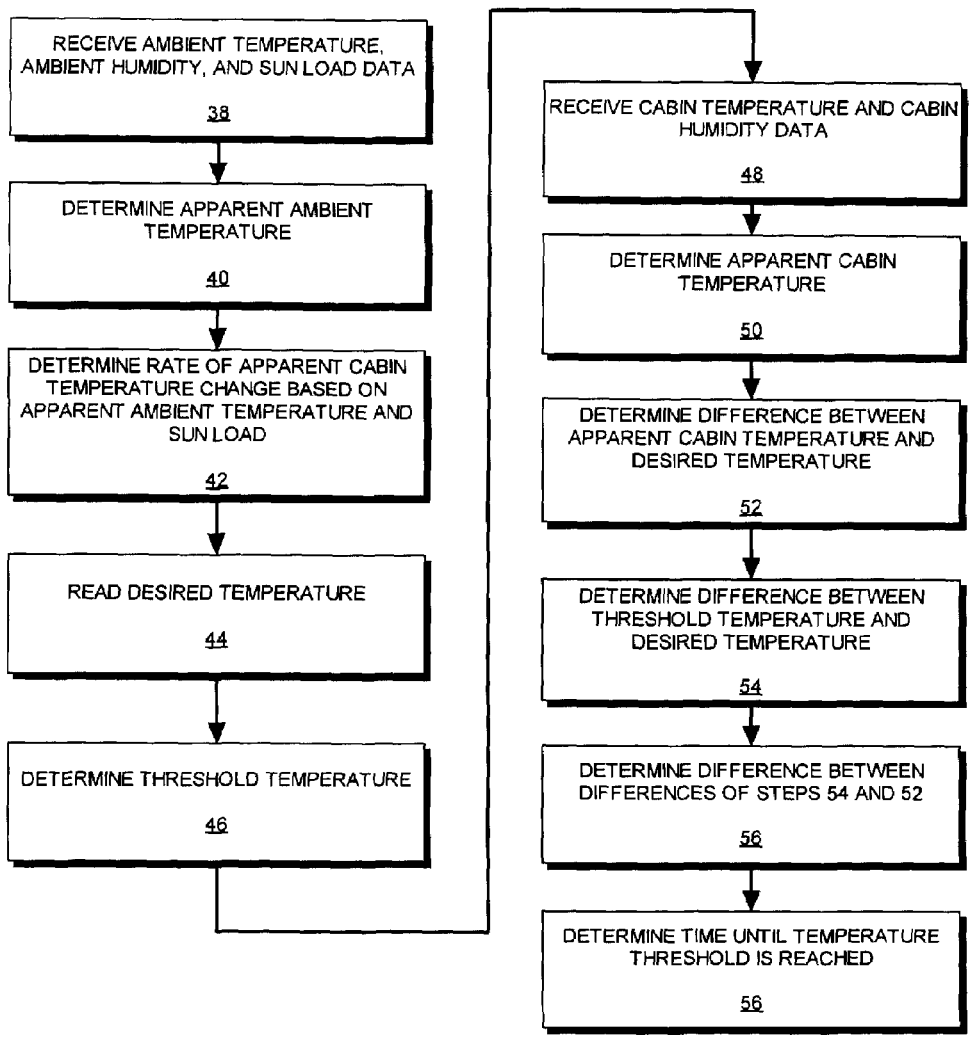
FIG. 5 shows a strategy for controlling a vehicle engine in accordance with an embodiment of the invention.
FIG. 7 shows example data used in implementing embodiments of the invention.

FIG. 5 shows a method for control system arrangement 36 to determine the time until the threshold temperature is reached. At step 38, control system arrangement 36 receives ambient temperature, e.g., 80 degrees F., ambient humidity, e.g., 10%, and sun load, e.g., 200, data. At step 40, control system arrangement 36 determines the apparent ambient temperature, e.g., 80 degrees F. At step 42, control system arrangement 36 determines, via a look-up table such as that shown in FIG. 4, the rate of apparent cabin temperature change based on the apparent ambient temperature and sun load, e.g., 5 seconds per degree F. At step 44, control system arrangement 36 reads the desired temperature, e.g., 72 degrees F. At step 46, the threshold temperature, e.g., 77 degrees F., is determined as described above. At step 48, control system arrangement 36 receives cabin temperature, e.g., 73 degrees F., and cabin humidity, e.g., 45%, data. At step 50, control system arrangement 36 determines apparent cabin temperature, e.g., 73 degrees F. At step 52, control system arrangement 36 determines the difference between the apparent cabin temperature and the desired temperature, e.g., 1 degree F. At step 54, control system arrangement 36 determines the difference between the threshold temperature and the desired temperature, e.g., 5 degrees F. At step 56, control system arrangement 36 determines the difference between the differences of steps 54 and 52, e.g., 4 degrees F. At step 58, control system arrangement 36 determines the time until the temperature threshold is reached by for example, multiplying the result of step 56, e.g., 4 degrees F., by the rate of step 42, e.g., 5 seconds per degrees, for a result of 60 seconds.

Figure 6:
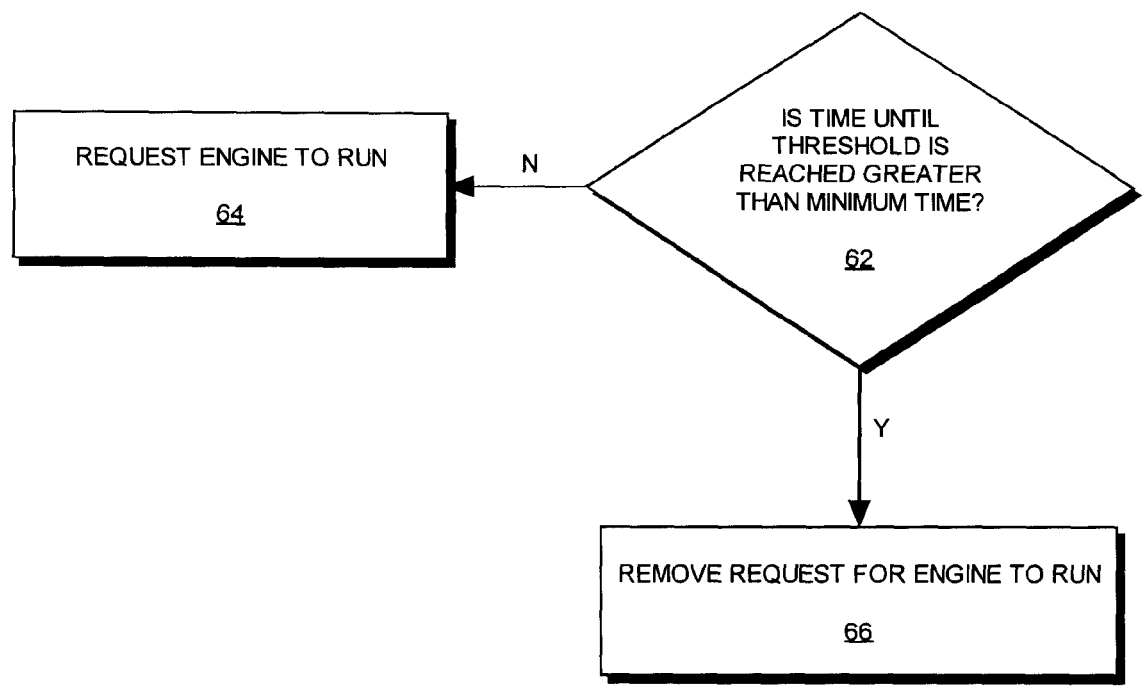
FIG. 6 shows a strategy for controlling a vehicle engine in accordance with an embodiment of the invention.

FIG. 6 shows a method for control system arrangement 36 to determine whether to request engine 12 to run. At step 62, control system arrangement 36 determines whether the time until the temperature threshold is reached is greater than a minimum time. If no, at step 64, control system arrangement 36 requests engine 12 to run, e.g., set an engine control flag to 1. If yes, at step 66, control system arrangement 36 removes a request for engine 12 to run, e.g., set the engine control flag to 0.

The minimum time may be predetermined, e.g., 45 seconds. The minimum time may take into account fuel economy and the comfort level of an occupant and be determined, for example, via testing. The minimum time may be based on a number of previous engine stops since vehicle ignition. As the number of previous engine stops increases, the minimum time increases. Such a strategy may result in a gain in perceived fuel economy as well as actual fuel economy. FIG. 7 shows an example set of minimum times by number of previous engine stops.

Figure 8:
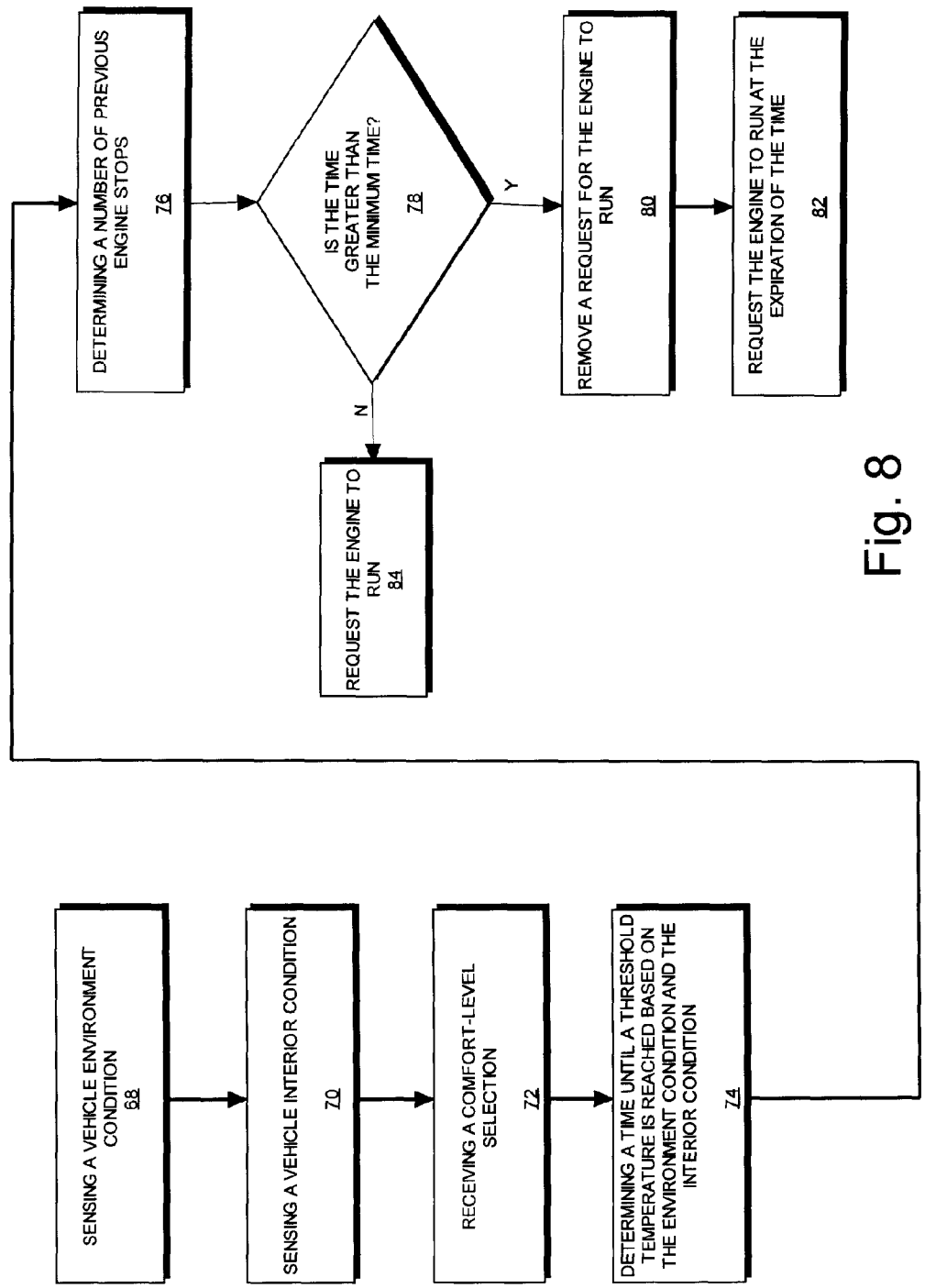
FIG. 8 shows a strategy for controlling a vehicle engine in accordance with an embodiment of the invention.

FIG. 8 shows a method for controlling an engine configured to drive a compressor of a vehicle air conditioning system having a desired temperature. At step 68, a vehicle environment condition is sensed. At step 70, a vehicle interior condition is sensed. At step 72, a comfort-level selection is received. At step 74, a determination is made regarding a time until a threshold temperature, which is based on the comfort level, is reached based on the environment condition and the interior condition. At step 76, a number of previous engine stops is determined. At step 78, a determination is made regarding whether the time is greater than the minimum time. If yes, at step 80, a request for the engine to run is removed. At step 82, the engine is requested to run at the expiration of the time. If no, at step 84, the engine is requested to run.

Other systems of vehicle 12 may request engine 12 to run even if control system arrangement 36 removes its request for engine 12 to run. For example, if control system arrangement 36 sets its engine control flag to 0, and a battery subsystem sets its engine control flag to 1, engine 12 may be commanded to run. If control system arrangement 36 sets its engine control flag to 0, and all other subsystems set their respective engine control flags to 0, engine 12 may be commanded to stop.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for controlling an engine configured to drive a compressor of a vehicle air conditioning system comprising:

a control system arrangement configured to receive a vehicle environment condition, receive a vehicle interior condition, determine a time until a threshold temperature is reached based on the environment condition and the interior condition, determine a number of engine stops, and remove a request for the engine to run if the time is greater than a predetermined minimum time that is based on the number of engine stops.

2. The system of claim 1 wherein the arrangement is further configured to request the engine to run if the time is less than the minimum time.

3. The system of claim 1 wherein the threshold temperature is a threshold apparent cabin temperature.

4. The system of claim 1 wherein the environment condition comprises at least one of an ambient temperature, an ambient humidity, and a sun load.

5. The system of claim 1 wherein the interior condition comprises at least one of a cabin temperature, a cabin humidity, and a sun load.

6. The system of claim 1 wherein the arrangement is further configured to receive a comfort-level selection including at least one of an economy mode and a non-economy mode and wherein the threshold in the economy mode is greater than the threshold in the non-economy mode.

7. The system of claim 1 wherein the arrangement is further configured to request the engine to run at the expiration of the time.

8. A method for controlling an engine configured to drive a compressor of a vehicle air conditioning system comprising:
sensing a vehicle environment condition;
sensing a vehicle interior condition;
determining a time until a threshold is reached based on the sensed conditions;
determining a number of engine stops; and
removing a request for the engine to run if the time is greater than a minimum time that is based on the number of engine stops.

9. The method of claim 8 further comprising requesting the engine to run if the time is less than the minimum time.

10. The method of claim 8 wherein the threshold is a threshold apparent cabin temperature.

11. The method of claim 8 wherein the minimum time is predetermined.

12. The method of claim 8 wherein the environment condition comprises at least one of an ambient temperature, an ambient humidity, and a sun load.

13. The method of claim 8 wherein the interior condition comprises at least one of a cabin temperature, a cabin humidity, and a sun load.

14. The method of claim 8 further comprising receiving a comfort-level selection including at least one of an economy mode and a non-economy mode and wherein the threshold in the economy mode is greater than the threshold in the non-economy mode.

\* \* \* \* \*